G. BANK.
SHOCK ABSORBER.
APPLICATION FILED OCT. 16, 1908.
931,671.
Patented Aug. 17, 1909.
2 SHEETS—SHEET 1.
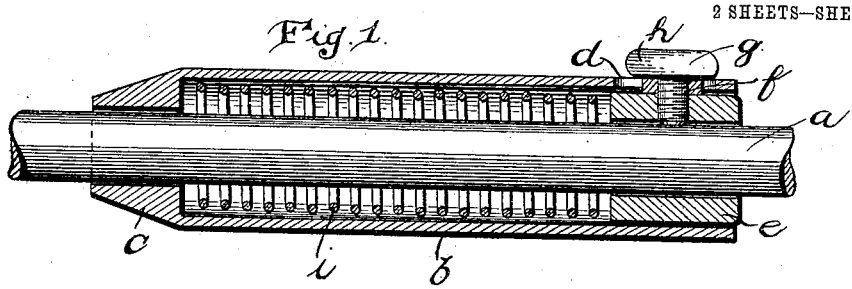
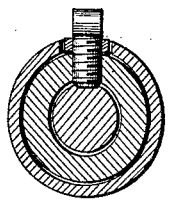
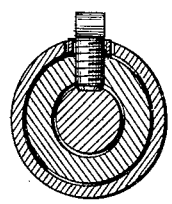
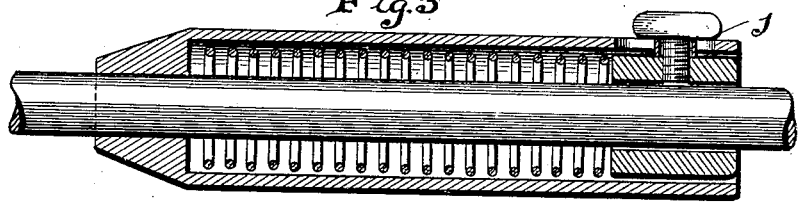
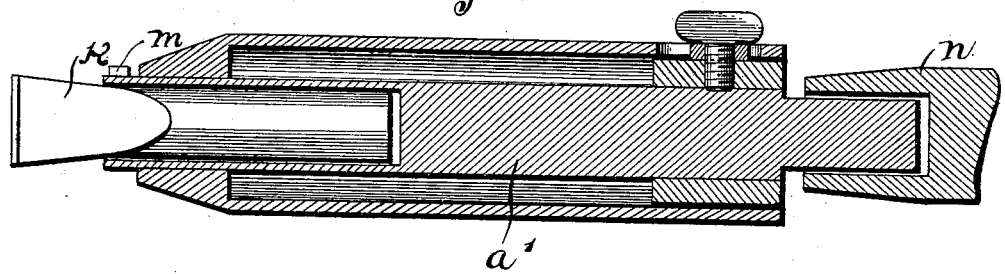
Witnesses
Jas. E. Dodge.
W. May. Durall.
Inventor
Gustav Bank.
By Wilkinson, Fisher & Witherspoon
Attorneys.

G. BANK.
SHOCK ABSORBER.
APPLICATION FILED OCT. 16, 1908.
931,671.
Patented Aug. 17, 1909.
2 SHEETS—SHEET 2.
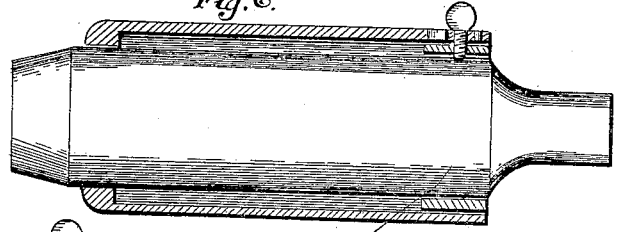
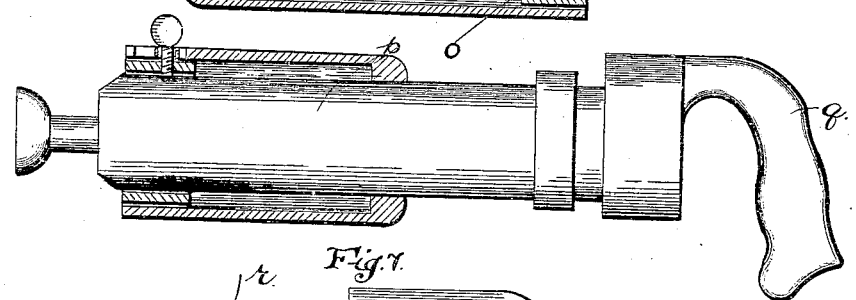
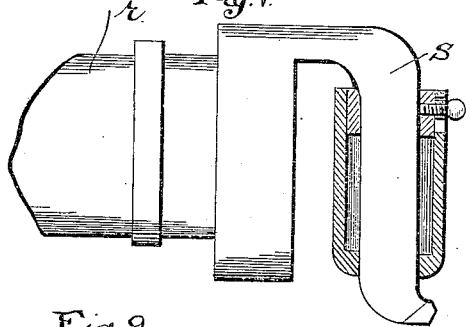
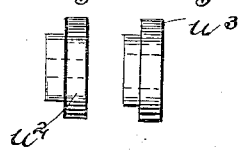
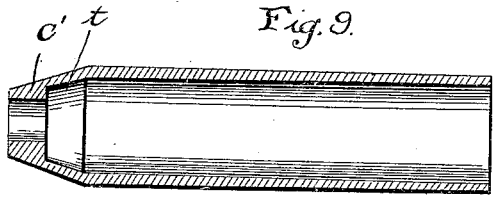
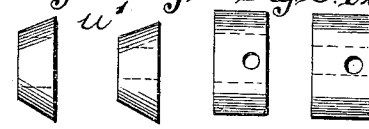
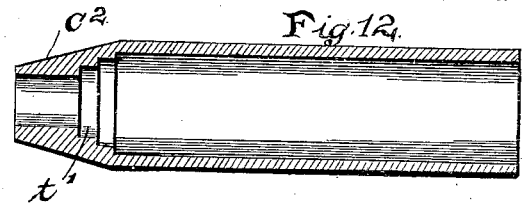
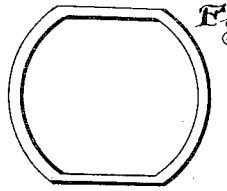
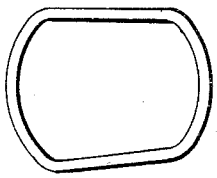
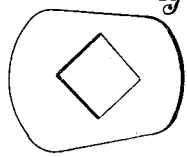
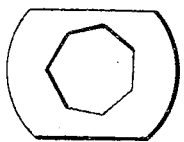
Witnesses
Jas. E. Dodge
W. Mad. Duvall
Inventor
Gustav Bank.
By Wilkinson, Fisher
& Witherspoon
Attorneys.

UNITED STATES PATENT OFFICE.

GUSTAV BANK, OF BUFFALO, NEW YORK.

SHOCK-ABSORBER.

No. 931,671.  Specification of Letters Patent.  Patented Aug. 17, 1909.

Application filed October 16, 1908. Serial No. 458,138.

*To all whom it may concern:*

Be it known that I, GUSTAV BANK, a citizen of the United States, residing at Buffalo, in the county of Erie and State of New York, have invented certain new and useful Improvements in Shock-Absorbers; and I do hereby declare the following to be a full, clear, and exact description of the invention, such as will enable others skilled in the art to which it appertains to make and use the same.

My invention relates to improvements in shock absorbers, and is designed for use with hand hammers, riveters, drills, chisels, picks, and all similar tools doing their work by repeated impact into or upon the material under the operator's hand. Such tools receive their power directly or indirectly from any mechanism which may be operated by compressed air, steam, electricity or any other motive power.

The object of my invention is to provide a simple device by which the shock to the workman, under the repeated action of the tool, will be minimized.

With this object in view, my invention consists in the construction and combinations of parts as hereinafter described and claimed.

In the accompanying drawings—Figure 1 is a longitudinal section showing a drill, or similar tool, with my invention applied thereto. Fig. 2 is a cross section of the same. Fig. 3 is a longitudinal section of a modified form of the shock absorber. Fig. 4 is a cross section of the same. Fig. 5 is a longitudinal section showing the invention applied to a chisel operated by a pneumatic hand hammer. Fig. 6 is a view of a pneumatic hand hammer with the invention applied thereto, and shown in section. Fig. 7 is a view of a pneumatic riveter showing my invention applied to the striking end. Fig. 8 is a view of a pneumatic riveter with the invention applied to the pistol grip thereof. Fig. 9 is a cross section of a modified form of the casing of my invention. Figs. 10 and 11 show, in side elevation, washers adapted to fit in the casing shown in Fig. 9. Fig. 12 is a longitudinal section of still another modified form of the casing. Figs. 13 and 14 show, in side elevation, washers adapted to be used with the casing shown in Fig. 12. Figs. 15 and 16 show sleeves adapted to be used with either of the casings shown in Figs. 9 and 12. Figs. 17 and 18 show, in end elevation, modified shapes of casing, and Figs. 19, 20, 21 and 22, show various forms of sleeves, and wedges or fillers adapted to be used with different forms of the casing. In Figs. 5, 6, 7 and 8 the recoil spring has been omitted.

Referring to Figs. 1 and 2, $a$ represents the shank of a chisel, drill, or similar tool, driven by power in any suitable manner. $b$ represents a hollow casing having a perforated head $c$ tapered on the outside. This head may be made integral with the main casing or may be attached thereto, as desired. By having it attached thereto or by using wedges or fillers, such as shown by Figs. 10, 11, 13, 14 etc., tools of different sizes or shapes may be used for the same casing. The outside of the casing $b$ is preferably knurled or roughened so that the workman may grip it firmly, or in case of large tools it may be provided with handles. The upper part of the casing $b$ is provided with an elliptical opening $d$. $e$ represents a sleeve which is adapted to slide freely within the casing $b$, and is of a size and shape to exactly fit the shank $a$ of the tool. $f$ represents a screw provided with a head $g$, or if desired an ordinary screw head may be used. $h$ represents a washer located between the head of the screw and the sleeve $e$. This sleeve and the washer $h$ are provided with screw-threaded perforations through which the screw $f$ passes, and the shank $a$ of the tool is preferably provided with a slight depression into which the end of the screw $f$ fits. By turning this screw home, therefore, it will be seen that the shank $a$, sleeve $e$, washer $h$ and screw $f$ are firmly fastened together and move as one piece. $i$ represents a coiled spring held in position between the part $c$ and the sleeve $e$. The operation of this form of device is as follows;—The workman holds the casing $b$ firmly in his hand, and as the shank $a$ is repeatedly and rapidly operated the sleeve $e$ is forced against the spring $i$, thereby absorbing the shock, the washer $h$ moving in the perforation $d$ meanwhile. The shock of the blow upon the tool is therefore partially taken up by the spring $i$ and not directly communicated to the hand of the operator.

In the forms shown in Figs. 3 and 4, the construction is just the same, except that instead of the washer $h$ a perforated roller $j$ is used, the operation being the same in each instance.

In Fig. 5, the principle of the operation is the same, but the shank $a'$ of the tool is hollowed out to receive a short tool $k$ removably held in place by a set screw $m$, and which may be of any desired shape. $n$ represents the reciprocating hammer for delivering blows on the tool shank $a'$.

Referring to Fig. 6, $o$ represents the outside shell of a small pneumatic hand hammer with my invention as applied thereto.

In Fig. 7, $p$ represents the outside shell of a pneumatic riveter provided with a pistol grip $q$, and having my invention applied to the striking end.

In Fig. 8, $r$ represents the shell of a pneumatic riveter, or hand hammer, having a pistol grip $s$, with my invention applied to said grip. In many instances it is desirable to have the shock absorber applied both to the striking end and to the pistol grip.

In Fig. 9, is represented a modified form of a casing, in that the end $c'$ is provided with shoulders, as shown at $t$, into which washers $u$ and $u'$ are adapted to fit, these washers having perforations of different sizes and shapes therein.

In Fig. 12, the end $c^2$ of the casing is provided with a plurality of shoulders $t'$ into which stepped washers $u^2$ and $u^3$ fit, said washers being provided with perforations of different sizes and shapes.

The casing, which is to be held by the operator's hand, may be made round or of any desired shape, as shown for example in Figs. 17 and 18, and the washers fitting into said casing are, of course, shaped on the outside to fit into said casing, and are provided with perforations of any desired shape, such as round, square, hexagonal, or any desired shape, as indicated in Figs. 19 and 22.

I claim:—

1. The combination with a power driven tool, of a shock absorber therefor consisting of a casing adapted to surround said tool and freely movable, said casing being provided with open ends and having a slot in its side, a sleeve located outside of said tool, a screw or pin passing through said sleeve, a filling piece secured by said screw to said sleeve, and projecting within the perforation in the side of the casing, and a spring confined in said casing between the end thereof and said sleeve, substantially as described.

2. The combination of a power driven tool, and a shock absorber carried thereby, said absorber consisting of a hollow casing provided at one end with an internal shoulder, said casing having an elongated slot in its side and being open at both ends, a hollow sleeve adapted to surround the tool and fit within one end of said casing, a filling piece adapted to project within the slot in the side of said casing, a screw or pin passing through said filling piece and said sleeve and engaging the tool support, and a spring located between said sleeve and one end of said casing, substantially as described.

3. The combination of a power driven tool and a shock absorber therefor, said absorber consisting of a casing open at both ends and provided with a shoulder at one end and having an elongated slot in its side, a sleeve adapted to fit within one end of said casing, a removable perforated wedge adapted to fit against the shoulder at the other end of said casing, a filling piece adapted to project from said sleeve into the perforation in the side of said casing, and a screw or pin firmly securing together said filling piece, sleeve and the shank of the tool, substantially as described.

In testimony whereof, I affix my signature, in presence of two witnesses.

GUSTAV BANK.

Witnesses:
ALONZO R. CLARKSON,
ALFRED GILLIS.